United States Patent
Hapsari et al.

(10) Patent No.: US 11,088,802 B2
(45) Date of Patent: Aug. 10, 2021

(54) BASE STATION AND CELL SETTING METHOD

(71) Applicant: NTT DOCOMO, INC., Tokyo (JP)

(72) Inventors: Wuri Andarmawanti Hapsari, Tokyo (JP); Naoto Ookubo, Tokyo (JP); Tooru Uchino, Tokyo (JP); Anil Umesh, Tokyo (JP)

(73) Assignee: NTT DOCOMO, INC., Tokyo (JP)

( * ) Notice: Subject to any disclaimer, the term of this patent is extended or adjusted under 35 U.S.C. 154(b) by 0 days.

(21) Appl. No.: 16/086,521

(22) PCT Filed: Mar. 23, 2017

(86) PCT No.: PCT/JP2017/011860
§ 371 (c)(1),
(2) Date: Sep. 19, 2018

(87) PCT Pub. No.: WO2017/164340
PCT Pub. Date: Sep. 28, 2017

(65) Prior Publication Data
US 2019/0089505 A1    Mar. 21, 2019

(30) Foreign Application Priority Data

Mar. 25, 2016 (JP) .............................. JP2016-062577

(51) Int. Cl.
*H04L 5/00* (2006.01)
*H04W 48/08* (2009.01)
(Continued)

(52) U.S. Cl.
CPC .......... *H04L 5/0051* (2013.01); *H04L 5/0023* (2013.01); *H04L 5/0032* (2013.01);
(Continued)

(58) Field of Classification Search
None
See application file for complete search history.

(56) References Cited

U.S. PATENT DOCUMENTS

2009/0046573 A1*  2/2009  Damnjanovic  ...... H04J 11/0093
                                                                  370/216
2012/0142354 A1*  6/2012  Ahluwalia ............ H04W 92/20
                                                                  455/436
(Continued)

FOREIGN PATENT DOCUMENTS

CN      102457312 A    5/2012
EP        2709392 A1    3/2014
(Continued)

OTHER PUBLICATIONS

International Search Report issued in PCT/JP2017/011860 dated Jun. 6, 2017 (1 page).

(Continued)

*Primary Examiner* — Eunsook Choi
(74) *Attorney, Agent, or Firm* — Osha Bergman Watanabe & Burton LLP (57) ABSTRACT

Provided is a base station used as a first base station in a radio communication system including the first base station, a second base station communicating with the first base station, and a user equipment communicating with the first base station. The base station includes: an acquiring unit that acquires a plurality of parameters used for an initial cell setting; and a setting unit that performs a cell setting using the acquired plurality of parameters.

6 Claims, 8 Drawing Sheets

(51) Int. Cl.
*H04W 88/08* (2009.01)
*H04W 24/02* (2009.01)
*H04L 25/02* (2006.01)
*H04W 48/12* (2009.01)
*H04W 92/20* (2009.01)

(52) U.S. Cl.
CPC ...... *H04L 25/0204* (2013.01); *H04L 25/0224* (2013.01); *H04W 24/02* (2013.01); *H04W 48/08* (2013.01); *H04W 88/08* (2013.01); *H04W 48/12* (2013.01); *H04W 88/085* (2013.01); *H04W 92/20* (2013.01)

(56) References Cited

U.S. PATENT DOCUMENTS

| | | |
|---|---|---|
| 2012/0320843 A1 | 12/2012 | Kim et al. |
| 2013/0051240 A1 | 2/2013 | Bhattad et al. |
| 2013/0083753 A1* | 4/2013 | Lee .................. H04W 72/0453 370/329 |
| 2013/0250882 A1* | 9/2013 | Dinan ................. H04L 5/0032 370/329 |
| 2014/0051426 A1* | 2/2014 | Siomina ............ H04W 36/0088 455/422.1 |
| 2014/0155122 A1 | 6/2014 | Okazaki et al. |
| 2014/0334386 A1* | 11/2014 | Fukumasa ............... H04W 8/26 370/328 |
| 2015/0016387 A1* | 1/2015 | Elmdahl ........... H04W 52/0206 370/329 |
| 2015/0099501 A1 | 4/2015 | Kim et al. |
| 2015/0103657 A1* | 4/2015 | Henderson ........ H04W 36/0083 370/232 |
| 2015/0111575 A1* | 4/2015 | Lei ...................... H04W 36/08 455/436 |
| 2015/0296359 A1* | 10/2015 | Edge .................. H04W 72/048 455/404.2 |
| 2015/0312775 A1* | 10/2015 | Yi ........................ H04W 16/00 370/254 |
| 2016/0088470 A1* | 3/2016 | Sivavakeesar .......... H04W 8/26 455/435.1 |
| 2016/0174124 A1* | 6/2016 | Basu Mallick ..... H04W 74/006 370/331 |
| 2016/0270006 A1 | 9/2016 | Choi et al. |
| 2016/0278030 A1* | 9/2016 | Yi ......................... H04W 56/00 |
| 2017/0086083 A1* | 3/2017 | Narayanan ........... H04W 24/06 |
| 2017/0180982 A1 | 6/2017 | Choi et al. |

FOREIGN PATENT DOCUMENTS

| | | |
|---|---|---|
| JP | 201197177 A | 5/2011 |
| JP | 2014-506100 A | 3/2014 |
| JP | 2014-060474 A | 4/2014 |
| JP | 2014110565 A | 6/2014 |
| JP | 2014-230196 A | 12/2014 |
| WO | 2007/040453 A2 | 4/2007 |
| WO | 2015060562 A1 | 4/2015 |
| WO | 2015/083911 A1 | 6/2015 |

OTHER PUBLICATIONS

Written Opinion of the International Searching Authority issued in PCT/JP2017/011860 dated Jun. 6, 2017 (4 pages).
"Docomo 5G white paper", Sep. 2014, NTT Docomo, Internet URL:<https://www.nttdocomo.co.jp/corporate/technology/whitepaper_5g/ (27 pages).
Extended European Search Report issued in counterpart European Patent Application No. 17770380.8, dated Oct. 7, 2019 (12 pages).
SK Telecom; "Requirements for C-RAN with flexible function splits"; 3GPP TSG RAN ad-hoc, RPa-160049; Barcelona, Spain; Jan. 28-29, 2016 (2 pages).
3GPP TSG-RAN WG1 #74bis; R1-134133 "On support of TDD-FDD Carrier Aggregation" Intel Corporation Guangzhou, China; Oct. 7-11, 2013 (4 pages).
Office Action issued in Japanese Application No. 2018-507419; dated Mar. 23, 2021 (4 pages).
Office Action issued in Chinese Application No. 201780019455.X, dated May 8, 2021 (13 pages).

* cited by examiner

| PHYSICAL CELL ID | |
|---|---|
| FREQUENCY INFORMATION | |
| | CENTER FREQUENCY (DL/UL) |
| | BANDWIDTH |
| | DUPLEX SCHEME |
| | TDD Config |
| NUMBER OF ANTENNAS | |
| MAXIMUM TRANSMISSION POWER | |
| MIB INFORMATION | |
| | SFN |
| | H-SFN |
| | Phich-Config |
| | DL BANDWIDTH |
| SYNCHRONIZATION SIGNAL INFORMATION | |
| SYSTEM INFORMATION | |
| | SIB1 |
| | SIB2 |
| | SIB3 |
| | ... |
| REFERENCE SIGNAL INFORMATION | |

FIG.8

BASE STATION AND CELL SETTING METHOD

TECHNICAL FIELD

The present invention relates to a base station and a cell setting method.

BACKGROUND ART

In order to efficiently support an area like a hot spot with high traffic in a radio communication system of Long Term Evolution (LTE) or LTE-advanced (LTE-A), a technique called a centralized radio access network (C-RAN) capable of accommodating a large number of cells while suppressing a device cost is known.

The C-RAN includes one or more radio units (RUs) serving as a base station of a remote installation type and a digital unit (DU) serving as a base station that concentratedly controls the RUs. The DU has functions of the layers 1 to 3 with which the base station is provided, and an Orthogonal Frequency Division Multiplexing (OFDM) signal generated by the DU is sampled and transmitted to the RU and transmitted through a radio frequency (RF) function unit with which the RU is equipped.

CITATION LIST

Non-Patent Document

Non-Patent Document 1: "Docomo 5G White Paper," September 2014, NTT Docomo, Internet URL: https://www.nttdocomo.co.jp/corporate/technology/whitepaper_5g/

SUMMARY OF THE INVENTION

Problem to be Solved by the Invention

Figure 1:
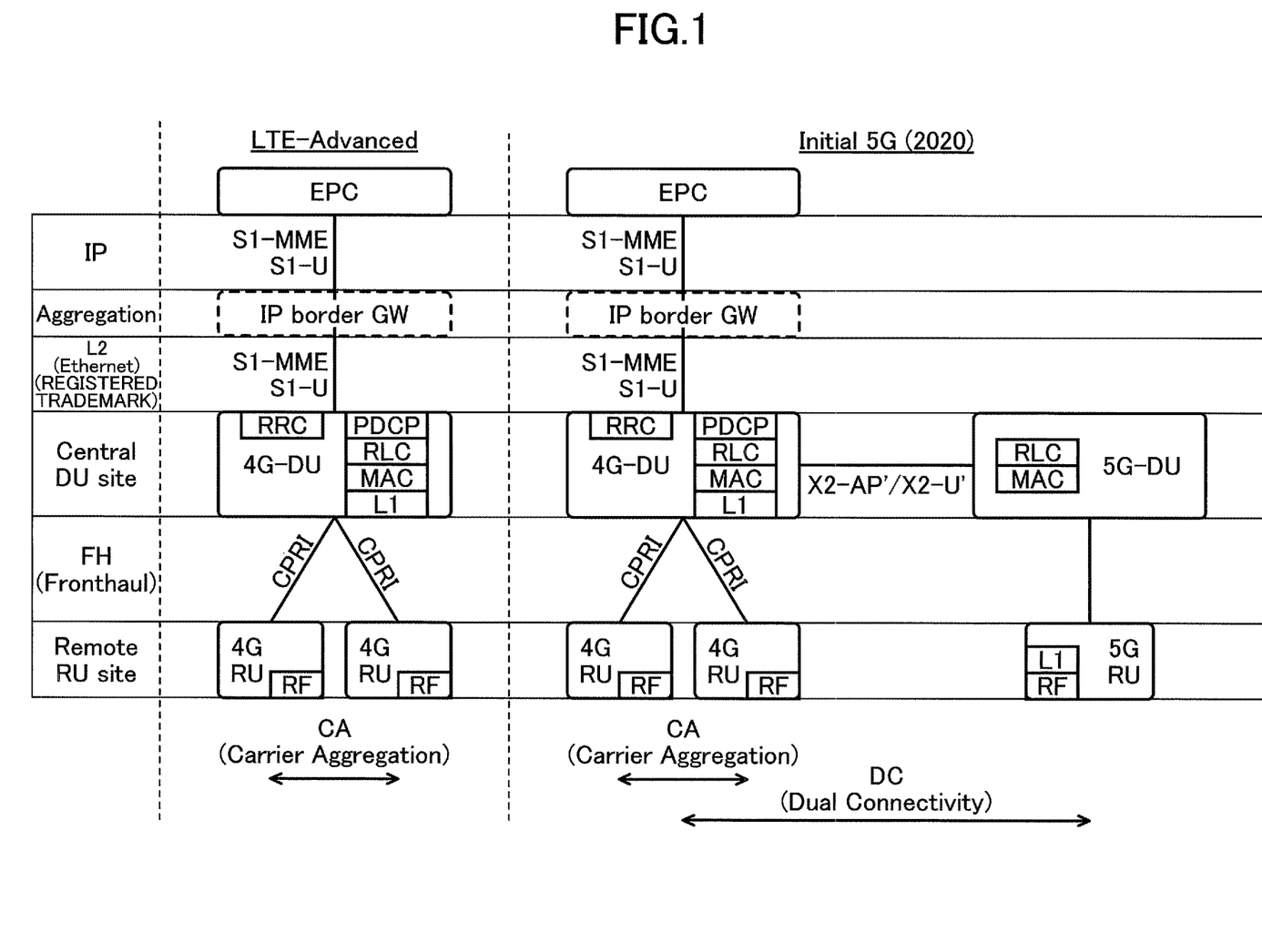
FIG. 1 is a diagram illustrating an exemplary C-RAN configuration which is under review in 5G.

Next, a C-RAN configuration which is under review in 5G will be described. In FIG. 1, a 4G-DU and a 4G-RU indicate a DU and RU having a functions of LTE-A (including a function of LTE). Further, a 5G-DU and a 5G-RU indicate a DU and a RU having a function of a 5-th generation radio technology. The 4G-DU and the 5G-DU are connected through an interface that is extended from X2-AP and X2-U interfaces in LTE. Further, a network line connecting the DU with the RU is called a fronthaul (FH), and in LTE, a common public radio interface (CPRI) is used as the FH.

In current LTE, the functions of the layer 1 (the physical layer: L1) and the layer 2 (MAC, RLC, and PDCP) are assumed to be implemented on the DU side. Therefore, a band necessary for the FH is about 16 times a peak rate supported by the DU. For example, if a system band is 20 MHz, and the DU supports radio communication of 2×2 Multi Input Multi Output (MIMO) (a maximum of 150 Mbps), a band necessary for the FH is about 2.4 Gbps.

In 5G which is currently under review, a peak rate of 10 Gbps or more and a lower delay are expected to be realized. Therefore, when 5G is introduced, the band necessary for the FH dramatically increases with the improvement in the peak rate. In this regard, reducing an amount of information to be transmitted through the FH by implementing some layers implemented in the DU on the RU side is under review. Various variations as to which the function of the layer is to be implemented on the RU side can be considered, but as an example, a plan of implementing all or some of the functions of the layer 1 with which the DU is provided through the RU, a plan of implementing some functions of the layer 1 and the layer 2 on the RU side, and the like are under review.

In the case where some of the functions of the layers with which the DU is provided are implemented on the RU side, it is necessary to retain information necessary for a cell setting on the RU side in advance. However, an interface for transmitting, to the RU side, information necessary for a cell setting is not currently specified in 3GPP.

The technology of the disclosure was made in light of the foregoing, and it is an object of the technology of the disclosure to provide a technique capable of transmitting, to the RU, information necessary for a cell setting in a radio communication network according to the C-RAN.

Means for Solving Problem

A base station of the technology of the disclosure is a base station used as a first base station in a radio communication system including the first base station, a second base station communicating with the first base station, and a user equipment communicating with the first base station, including: an acquiring unit that acquires a plurality of parameters used for an initial cell setting; and a setting unit that performs a cell setting using the acquired plurality of parameters.

Effect of the Invention

According to the technology of the disclosure, a technique capable of transmitting, to the RU, information necessary for a cell setting in a radio communication network according to the C-RAN is provided.

MODE(S) FOR CARRYING OUT THE INVENTION

Hereinafter, an exemplary embodiment of the present invention will be described with reference to the appended drawings. An embodiment to be described below is merely an example, and an embodiment to which the present invention is applied is not limited to the following embodiment. For example, a radio communication system according to the present embodiment is assumed to be a system of a scheme conforming to LTE, but the present invention is not limited to LTE but applicable to other schemes. In this specification and claims set forth below, "LTE" is used in a broad sense including Releases 10, 11, 12, 13, or 14 of 3GPP or a 5th generation communication scheme corresponding to releases subsequent to Release 14 in addition to communication schemes corresponding to Release 8 or 9 of 3GPP unless otherwise specified.

The "layer 1" and the "physical layer" are synonymous. The layer 2 includes a medium access control (MAC) sublayer, a radio link control (RLC) sublayer, and a packet data convergence protocol (PDCP) sublayer. The layer 3 also includes a radio resource control (RRC) layer.

<System Configuration>

Figure 2:
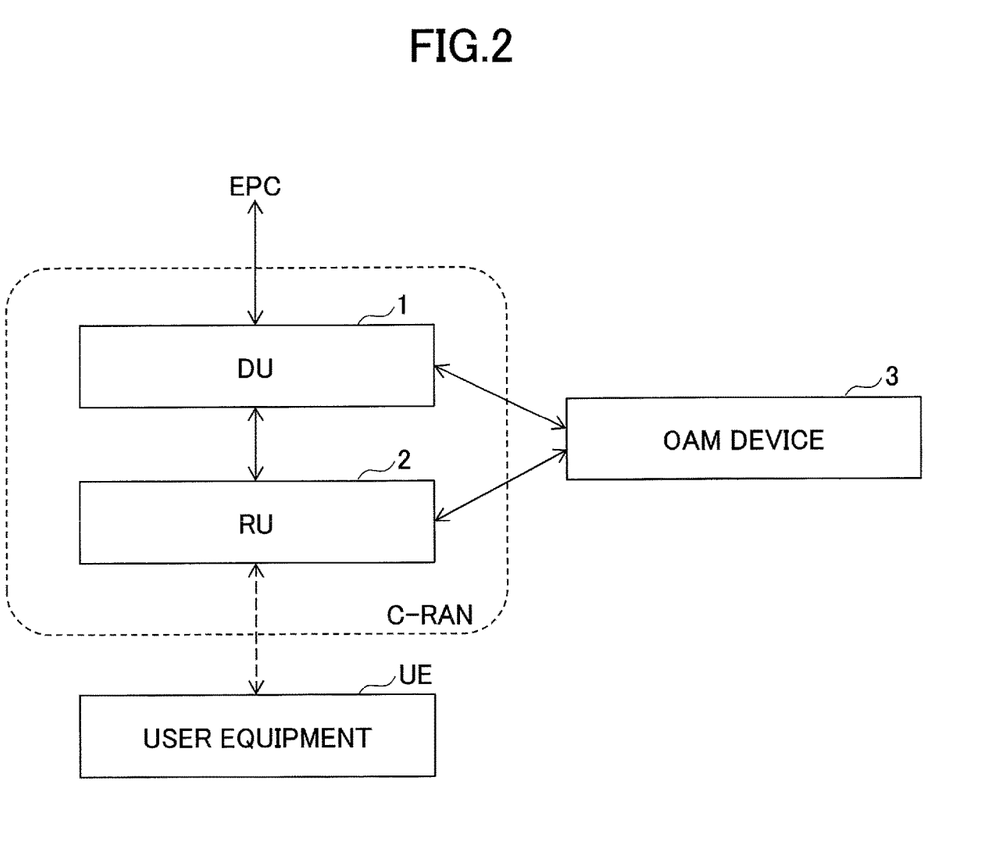
FIG. 2 is a diagram illustrating an exemplary system configuration of a radio communication system according to an embodiment.

FIG. 2 is a diagram illustrating an exemplary system configuration of a radio communication system according to an embodiment. As illustrated in FIG. 2, the radio communication system according to the present embodiment includes a DU 1, a RU 2, an operation and management (OAM) device 3, and a user equipment UE. One RU 2 is illustrated in FIG. 2, but two or more RUs 2 may be included. In other words the DU 1 may be configured to control a plurality of RUs 2.

The DU 1 is also referred to as a central digital unit, a baseband unit (BBU), or a central unit (CU). The DU 1 is also referred to as a central base station or also referred to simply as a base station (enhanced Node B (eNB)).

The RU 2 is also referred to as a remote radio unit (RRU), a remote antenna unit (RRA), or a remote radio head (RRH). The RU 2 is also referred to as a remote base station or also referred to simply as a base station. The DU 1 and the RU 2 are connected via the FH and perform communication with each other using a protocol used for the FH.

The OAM device 3 has a function of monitoring and controlling the DU 1 and the RU 2. Examples of the monitoring performed by the OAM device 3 include monitoring of the presence or absence of an abnormality and monitoring of a traffic situation, and examples of the control performed by the OAM device 3 include activation and stoppage of the DU 1 and the RU 2, transmission and setting of various kinds of configuration to the DU 1 and the RU 2, reactivation of the function units mounted in the DU 1 and the RU 2, and switching of a redundant configuration of the function unit.

In the radio communication system according to the present embodiment, a predetermined signal is transmitted and received between the DU 1 and the RU 2 via the FH, and all or some of the functions of the layer 1 are performed by the RU 2. The radio communication system according to the present embodiment may also have a configuration in which only a part of the layer 1 is performed on the RU 2 side or a configuration in which all of the layer 1 is performed on the RU 2 side.

<Processing Procedure>
(Processing Sequence)

Next, a specific processing procedure performed in the radio communication system according to an embodiment will be described. In a general C-RAN, a plurality of RUs 2 are connected under the control of the DU 1, and an operation of adding a new RU 2 under the control of the DU 1 is performed based on a communication quality state or an environmental change such as an increase in traffic. Therefore, when an operation of a new RU 2 starts, it is necessary to set various kinds of parameters necessary for the RU 2 to perform the process of the layer 1 in the RU 2 in advance.

Figure 3A:
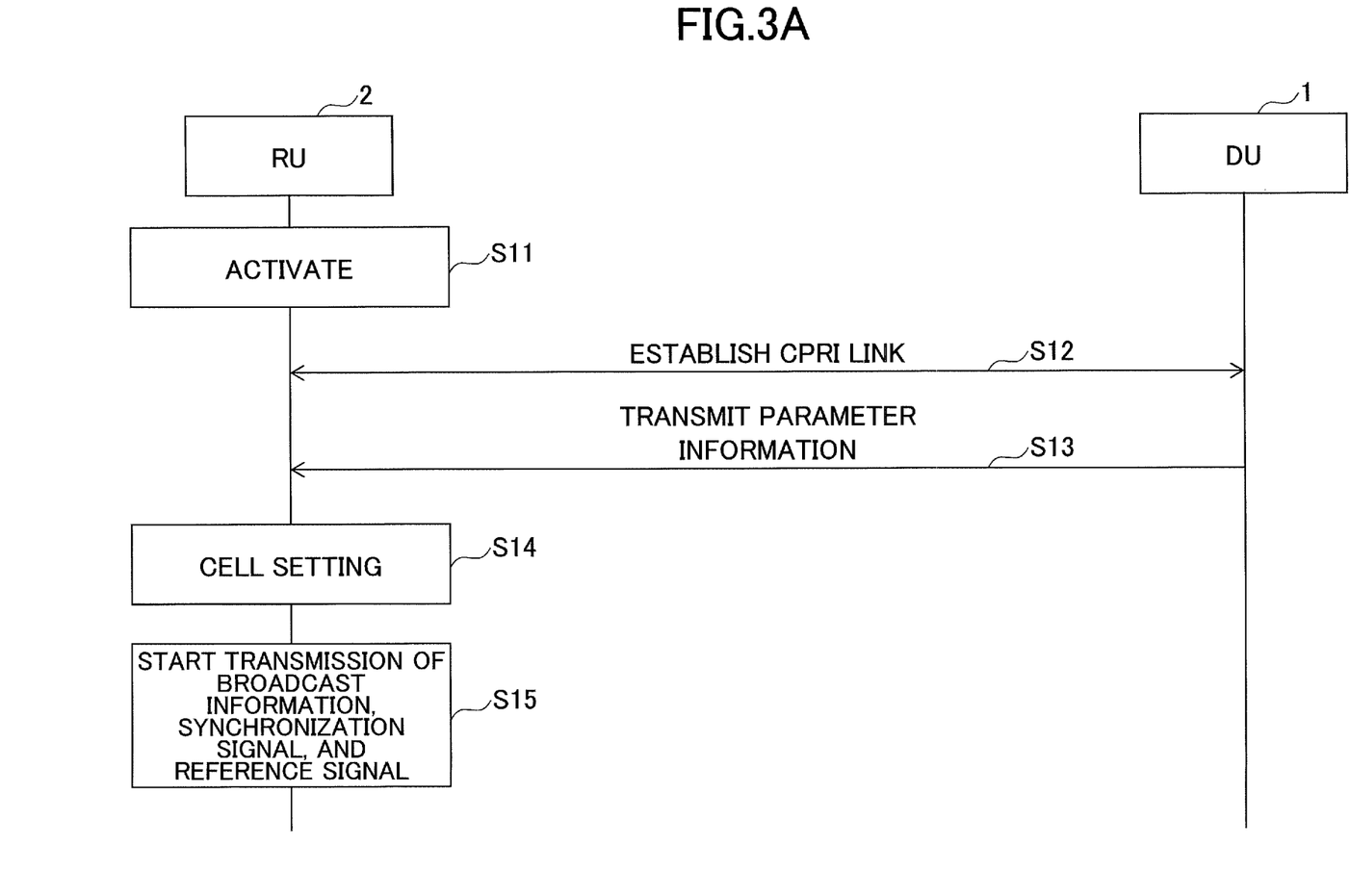
FIG. 3A is a sequence diagram illustrating an example of a processing procedure performed in a radio communication system according to an embodiment.
Figure 3B:
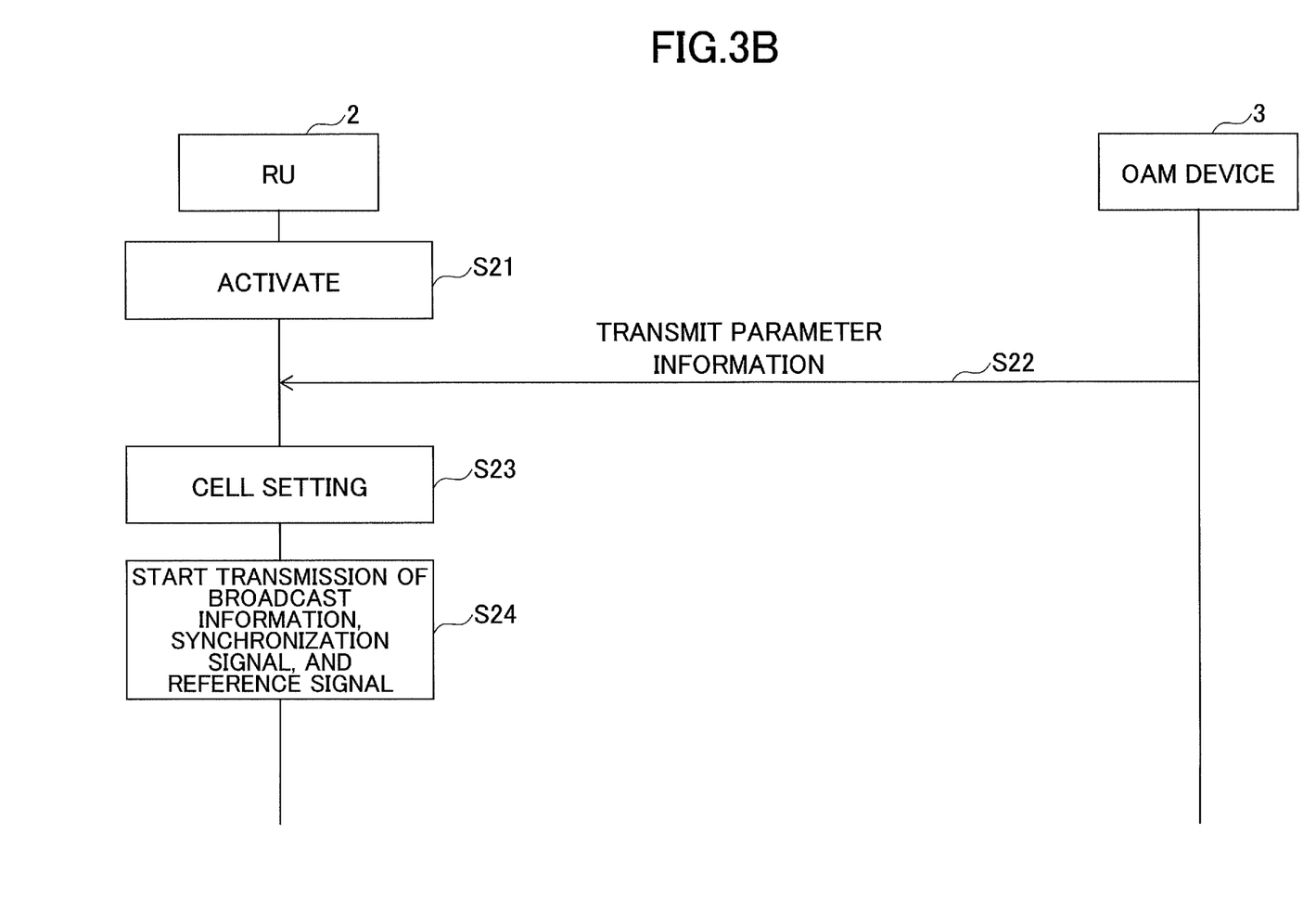
FIG. 3B is a sequence diagram illustrating an example of a processing procedure performed in a radio communication system according to an embodiment.

FIG. 3A and FIG. 3B are sequence diagrams illustrating an example of a processing procedure performed in the radio communication system according to the embodiment.

FIG. 3A illustrates an example of a processing procedure of transmitting parameter information from the DU 1 to the RU 2.

First, the RU 2 is activated by an instruction given from the OAM device 3, an operation performed by an operator, or the like (S11). Then, the RU 2 establishes a connection with the DU 1 (that is, establishes a CPRI link) (S12). Then, the DU 1 detects that the connection has been established with the RU 2, and transmits, to the RU 2, parameter information including various kinds of parameters necessary for the RU 2 to perform the process of the layer (S13). Further, the DU 1 may transmit, to the RU 2, the parameter information using a message used in a predetermined protocol. The message used in the predetermined protocol may be, for example, a management and control protocol message specified in CPRI or may be a message of a protocol corresponding to an X2-application protocol (X2-AP) of a related art which is likely to be newly specified in 5G.

Then, the RU 2 performs a cell setting (which is also referred to as a "cell setup" or an "initial cell setting") using various kinds of parameters included in the reported parameter information (S14). The cell setting indicates an operation of triggering a state in which radio communication according to various kinds of parameters can be performed with the user equipment UE by setting various kinds of reported parameters in a memory or the like. Then, the RU 2 initiates transmission of broadcast information (a master information block (MIB) and a system information block (SIB)), a synchronization signal, and a reference signal according to various kinds of parameters set in the memory or the like (S15). When the above processing procedure is performed, the user equipment UE can detect the radio signal transmitted from the RU 2 and start the radio communication with the RU 2.

FIG. 3B illustrates an example of a processing procedure of transmitting the parameter information from the OAM device 3 to the RU 2. In the example of FIG. 3B, the parameter information is transmitted from the OAM device 3 to the RU 2 (S22). Further, the OAM device 3 may transmit the parameter information to the RU 2 when an indication indicating that the RU 2 is activated is received from the RU 2 or transmit the parameter information to the RU 2 according to an instruction of the operator. The processing procedure of steps S21, S23, and S24 of FIG. 3B are the same as the processing procedure of steps S11, S14, and S15 of FIG. 3A, and thus description thereof is omitted.

The processing sequence described above is assumed to be performed when the RU 2 is activated, but the present invention is not limited thereto. The DU 1 and the OAM device 3 may transmit updated (changed) parameter information to the RU 2 through the processing procedure of steps S13 and S22 when it is necessary to update (change) the parameter information. In this case, the RU 2 performs the cell setting again according to the updated (changed) parameters (S14 and S23) and transmits the broadcast information, the synchronization signal, and the reference signal according to the updated (changed) parameters (S15 and S24).

(Parameter Information)

Figure 4:
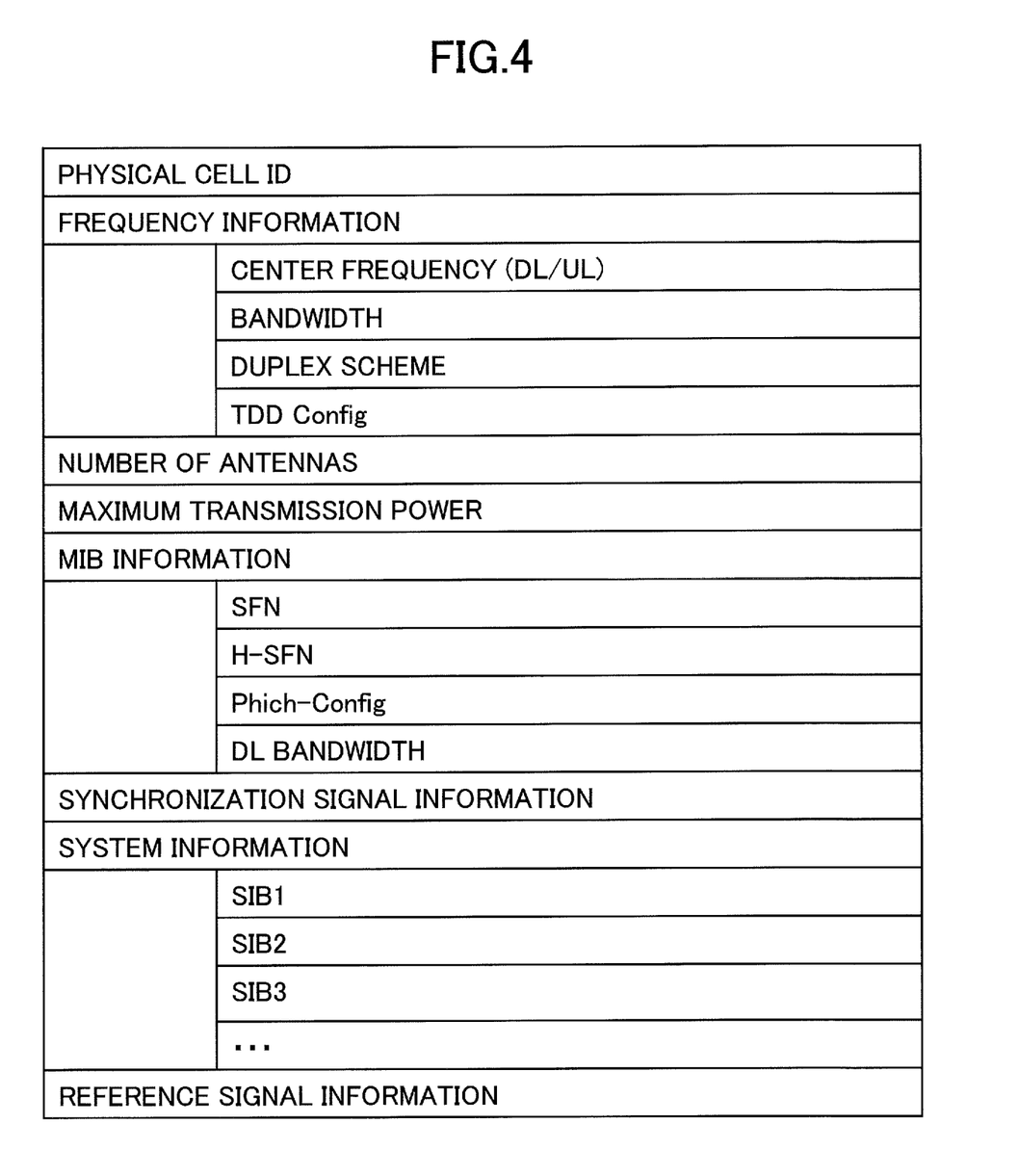
FIG. 4 is a diagram illustrating an example of parameter information.

FIG. 4 illustrates an example of the parameter information reported from the DU 1 or the OAM device 3 to the RU 2. "Physical cell ID" is a physical cell ID (a physical layer cell identity (PCI)) used when the RU 2 performs the process of the layer 1. The "physical cell ID" may be specifically designated using an ID value (any one of 0 to 503 in LTE) or may be divided into a plurality of elements ad designated. For example, when a format of a physical cell ID of LTE is applied, the "physical cell ID" may be divided into a physical layer cell ID group (a physical-layer cell-identity group) of 0 to 167 and a physical layer ID (a physical-layer identity) of 0 to 2 and reported. The present invention is not limited thereto, and the physical cell ID can be transmitted by using any method.

"Frequency information" is information related to a frequency of a radio signal to be transmitted by the RU 2. Further, "center frequency (downlink (DL)/uplink (UL))," "bandwidth," and "duplex scheme" are included in the "frequency information."

The "center frequency (DL/UL)" indicates a center frequency between a radio signal (DL) to be transmitted by the RU 2 and a radio signal (UL) to be received by the RU 2. The "bandwidth" indicates transmission bands of the radio signal (DL) to be transmitted by the RU 2 and the radio signal (UL) to be received by the RU 2. The "duplex scheme" indicates a duplex scheme (frequency division duplex (FDD) or time division duplex (TDD)) to be used for radio communication by the RU 2. In the case where the duplex scheme to be used for radio communication by the RU 2 is TDD, "TDD Config" is further included in the parameter information. In the "center frequency (DL/UL)" and the "duplex scheme," the center frequency (DL/UL) and the duplex scheme may be specifically designated or may be indicated by "operating Band" and "E-UTRA absolute radio frequency channel number (EARFCN)."

Since the duplex scheme is uniquely fixed for each operating band according to the 3GPP specification, the RU 2 can detect the duplex scheme from the operating band. Further, the center frequencies of DL and UL can be calculated by substituting the operating band and EARFCN into a predetermined calculation formula according to the 3GPP specification (Chapter 5.7.3 in TS 36.104 in LTE).

The "number of antennas" indicates the number of antennas included in the RU 2. Further, the RU 2 may detect the "number of antennas" for itself. In this case, the "number of antennas" may be omitted from the parameter information. "Maximum transmission power" indicates maximum transmission power (Pmaxx: maximum total output power) permitted for RU 2.

"MIB information" is information used for transmitting the MIB from the RU 2. In the "MIB information," content of the MIB to be transmitted by the RU 2 may be set, or values of information elements included in the MIB may be set.

Examples of the information element included in the MIB include "system frame number (SFN)," "hyper-SFN (H-SFN)," "parameter in Phich-Config," and "DL bandwidth."

A start number of the SFN set in the MIB or information indicating a correspondence between a time and an SFN is set in the "SFN."

The information indicating the correspondence between the time and the SFN is assumed to be set, for example, when it is necessary to synchronize the SFN with another cell. Similarly, a start number of an H-SFN set in an SIB 1 or information indicating a correspondence between a time and the H-SFN is set in the "H-SFN."

The information indicating the correspondence between the time and the H-SFN is assumed to be used, for example, when it is necessary to synchronize the H-SFN with another cell. Further, the "SFN" or the "H-SFN" may be omitted. When the "SFN" or the "H-SFN" is omitted, the RU 2 may arbitrarily decide the SFN or the H-SFN to be set in the MIB. "Parameter in "Phich-Config" is a PHICH duration (PHICH-Duration) and a PHICH resource (PHICH-Resource) in the case of LTE. "DL bandwidth" may be omitted since it can be recognized from the "bandwidth" in the "frequency information" above described. The "H-SFN" may be included in system information to be described later rather than the MIB information.

"Synchronization signal information" is information indicating a sequence of synchronization signals to be transmitted from the RU 2. In the case where it is possible to generate the sequence of synchronization signals using various kinds of parameters (for example, the PCI or the PCI and the number of antennas) included in the parameter information, the "synchronization signal information" may be omitted from the parameter information.

"System information" is information indicating content of the SIB to be transmitted from the RU 2 (the SIB (SIB Type 1) to an SIB 20 (SIB Type 20) in Release 13 of LTE). Content of the SIB to be transmitted by the RU 2 may be set or values of information elements included in the SIB may be set in the "system information."

"Reference signal information" is information indicating a sequence of reference signals to be transmitted from the RU 2. In LTE, since a sequence of unique reference signals within a cell can be generated from the PCI, the "reference signal information" may be omitted from the parameter information.

(Transmission of Broadcast Information, Synchronization Signal, and Reference Signal)

When the broadcast information, the synchronization signal, and the reference signal are transmitted through the processing procedure of step S15 in FIG. 3A or step S24 in FIG. 3B, the RU 2 may transmit the broadcast information, the synchronization signal, and the reference signal according to one of methods to be described below.

[Transmission Method of Broadcast Information (MIB) (1/2)]

When content of the MIB to be transmitted by the RU 2 is set in the "MIB information" of the parameter information, the RU 2 may transmit the set "MIB information" without change. In other words the MIB to be transmitted by the RU 2 may be generated on the DU 1 side or the OAM device 3 side. The value of the SFN (or the SFN and the H-SFN) included in the MIB varies according to a timing at which the MIB is transmitted. Therefore, when the transmission method (1/2) is used, the RU 2 rewrites the SFN (or the SFN and the H-SFN) included in the MIB according to the timing at which the MIB is transmitted.

[Transmission Method of Broadcast Information (MIB) (2/2)]

In the case where the values of the information elements included in the MIB is set in the "MIB information" of the parameter information, the RU 2 may generate the MIB to be transmitted based on the "MIB information" and transmit the generated MIB. In other words, the MIB to be transmitted by the RU 2 may be generated by the RU 2.

[Transmission Method of Synchronization Signal (1/2)]

In the case where the sequence of synchronization signals to be transmitted by the RU 2 is set in the "synchronization signal information" of the parameter information, the RU 2 may transmit the synchronization signal using the set sequence without change. In other words, the sequence of synchronization signals to be transmitted by the RU 2 may be generated on the DU 1 side or the OAM device 3 side.

[Transmission Method of Synchronization Signal (2/2)]

In the case where the "synchronization signal information" of the parameter information is omitted, the RU 2 may generate the sequence of synchronization signals to be transmitted based on the "PCI" (or the "PCI" and the "number of antennas" or the like) and transmit the synchronization signal using the generated sequence. In other words, the sequence of synchronization signals to be transmitted by the RU 2 may be generated by the RU 2 for itself. In the case of LTE, a sequence used for a primary synchronization signal (PSS) can be generated from the physical layer ID which is a part of the PCI, and a sequence used for a secondary synchronization signal (SSS) can be generated from the physical layer cell ID group which is a part of the PCI.

[Transmission Method of Broadcast Information (SIB) (1/2)]

In the case where content of the SIB to be transmitted by the RU 2 is set in the "SIB information" of the parameter information, the RU 2 may transmit the set "SIB information" without change. In other words, the SIB to be transmitted by the RU 2 may be generated on the DU 1 side or the OAM device 3 side.

When the transmission method (1/2) is used, the RU 2 appropriately acquires the information necessary for the cell setting (S14 in FIG. 3A or S23 in FIG. 3B) from the SIB information. In the current LTE, the information necessary for the cell setting is included in RadioResourceConfigCommonSIB in an SIB 2, but the present invention is not limited thereto, and in the present embodiment, it may be acquired from any other SIB. More specifically, RACH-ConfigCommon, BCCH-Config, PCCH-Config, PRACH-ConfigSIB, PDSCH-ConfigCommon, PUSCH-ConfigCommon, PUCCH-ConfigCommon, SoundingRS-UL-ConfigCommon, and UplinkPowerControlCommon are included in the RadioResourceConfigCommonSIB.

[Transmission Method of Broadcast Information (SIB) (2/2)]

In the case where the values of the information elements included in the SIB is set in the "SIB information" of the parameter information, the RU 2 may generate the SIB to be transmitted based on the "SIB information" and transmit the generated SIB. In other words, the SIB to be transmitted by the RU 2 may be generated by the RU 2.

When the transmission method (2/2) is used, the information necessary for the cell setting and the information whose individual setting values need not be detected by the RU 2 (that is, information which is simply transmitted as the SIB) may be separately set in the "system information" of the parameter information.

[Transmission Method of Reference Signal (1/2)]

In the case where the sequence of reference signals to be transmitted by the RU 2 is set in the "reference signal information" of the parameter information, the RU 2 may transmit the reference signal using the set sequence without change. In other words the sequence of reference signals to be transmitted by the RU 2 may be generated on the DU 1 side or the OAM device 3 side.

[Transmission Method of Reference Signal (Part 2)]

In the case where the "reference signal information" of the parameter information is omitted, the RU 2 may generate the sequence of synchronization signals to be transmitted based on the "PCI" and transmit the reference signal using the generated sequence. In other words, the sequence of reference signals to be transmitted by the RU 2 may be generated by the RU 2.

<Functional Configuration>

(DU)

Figure 5:
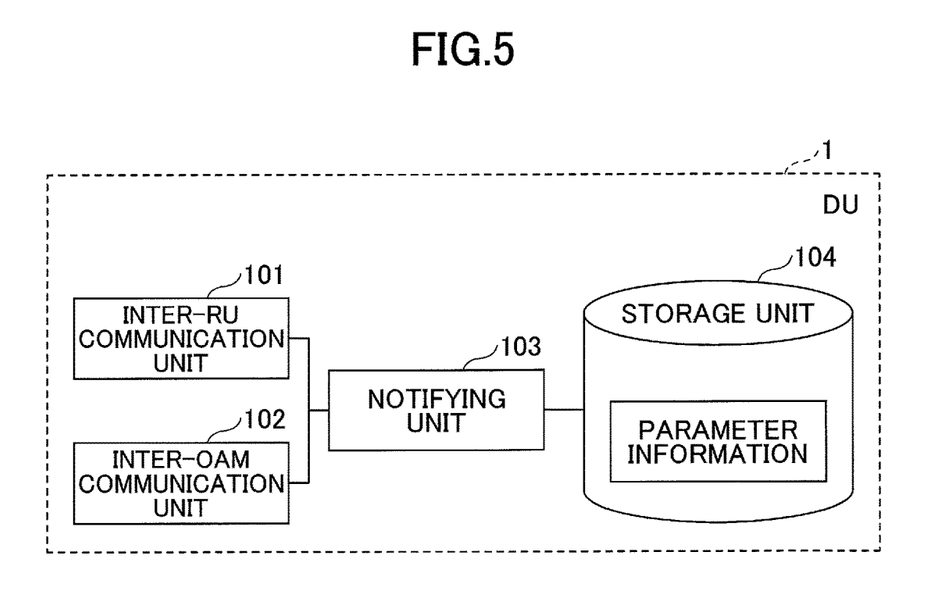
FIG. 5 is a diagram illustrating an exemplary functional configuration of a DU according to an embodiment.

FIG. 5 is a diagram illustrating an exemplary functional configuration of the DU according to an embodiment. As illustrated in FIG. 5, the DU 1 includes an inter-RU communication unit 101, an inter-OAM communication unit 102, a notifying unit 103, and a storage unit 104.

FIG. 5 illustrates only function units of the DU 1 particularly related to the embodiment, and functions (not illustrated) of performing operations conforming to at least LTE (including 5G). Further, the functional configuration illustrated in FIG. 5 is merely an example. Any classification and names can be used as function classification and names of the functional units as long as the operation according to the present embodiment can be performed. However, some of the processes of the DU 1 described above (for example, only one or more specific modified examples, specific examples, or the like) may be able to be performed.

The inter-RU communication unit 101 has a function of generating a signal by performing the processes of the respective layers on data to be transmitted from the DU 1 and transmitting the generated signal to the RU 2 via the FH. Further, the inter-RU communication unit 101 has a function of receiving a signal from the RU 2 via the FH and acquiring data by performing the processes of the respective layers on the received signal. The inter-RU communication unit 101 has a function as an interface of a predetermined protocol used in the FH. The inter-OAM communication unit 102 has a function of communicating with the OAM device 3.

The notifying unit 103 has a function of transmitting the parameter information stored in the storage unit 104 to the RU 2 through the inter-RU communication unit 101. The storage unit 104 stores the parameter information in a memory or the like.

(RU)

Figure 6:
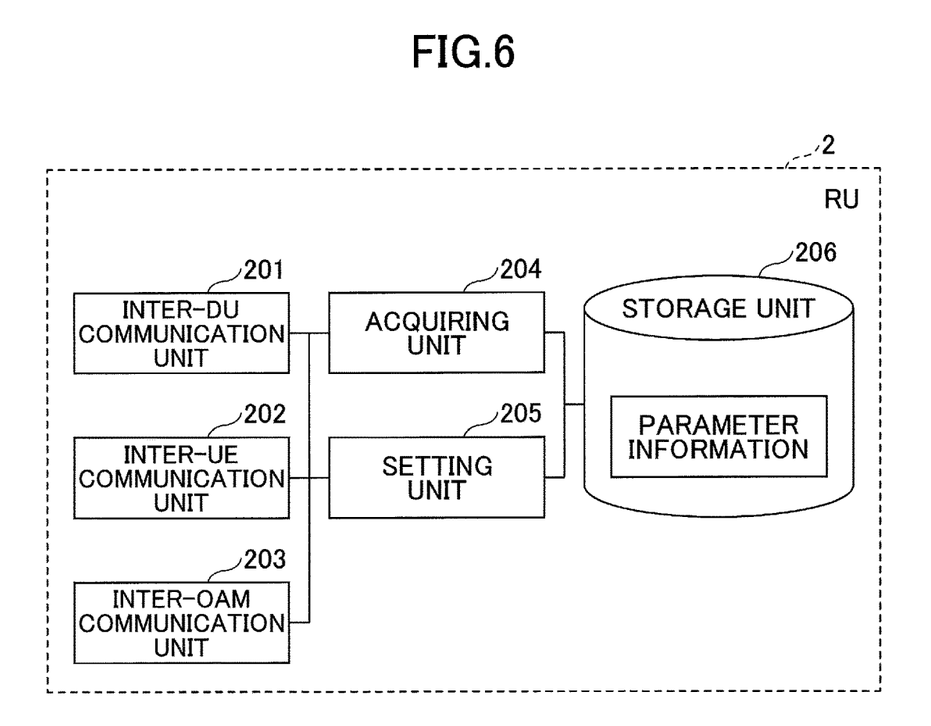
FIG. 6 is a diagram illustrating an exemplary functional configuration of an RU according to an embodiment.

FIG. 6 is a diagram illustrating an exemplary functional configuration of an RU according to an embodiment. As illustrated in FIG. 6, the RU 2 includes an inter-DU communication unit 201, an inter-UE communication unit 202, an inter-OAM communication unit 203, an acquiring unit 204, a setting unit 205, and a storage unit 206.

FIG. 6 illustrates only function units of the DU 1 particularly related to the embodiment, and functions (not illustrated) of performing operations conforming to at least LTE (including 5G). Further, the functional configuration illustrated in FIG. 6 is merely an example. Any classification and names can be used as function classification and names of the functional units as long as the operation according to the present embodiment can be performed. However, some of the processes of the RU 1 described above (for example, only one or more specific modified examples, specific examples, or the like) may be able to be performed.

The inter-DU communication unit 201 has a function of transmitting a signal to be transmitted to the DU 1 to the DU 1 via the FH. Further, the inter-DU communication unit 201 has a function of receiving a signal from the DU 1 via the FH. Further, the inter-DU communication unit 201 has a function as an interface of a predetermined protocol used in the FH.

The inter-UE communication unit 202 has a function of performing the process of the layer 1 on data received from the DU 1 through the inter-DU communication unit 201 and transmits the resulting data to the user equipment UE. Further, the inter-UE communication unit 202 has a function of receiving a radio signal from the user equipment UE, performing the process of the layer 1 on the received radio signal, and transferring the resulting signal to the inter-DU communication unit 201. The inter-OAM communication unit 203 has a function of communicating with the OAM device 3.

The acquiring unit 204 has a function of acquiring the parameter information from the DU 1 (or from the OAM device 3) through the inter-DU communication unit 201 (or through the OAM communication unit 203). Further, the acquiring unit 204 may acquire the parameter information when a connection is established between the RU 2 and the DU 1 or when a plurality of parameters used for the cell setting are updated.

The setting unit 205 has a function of performing the cell setting using various kinds of parameters included in the parameter information acquired by the acquiring unit 204.

The entire functional configurations of the DU 1 and the RU 2 described above may be implemented by a hardware circuit (for example, one or more IC chips), or a part of the functional configurations may be constituted by a hardware circuit, and the remaining parts may be realized by a CPU and a program.

(DU)

Figure 7:
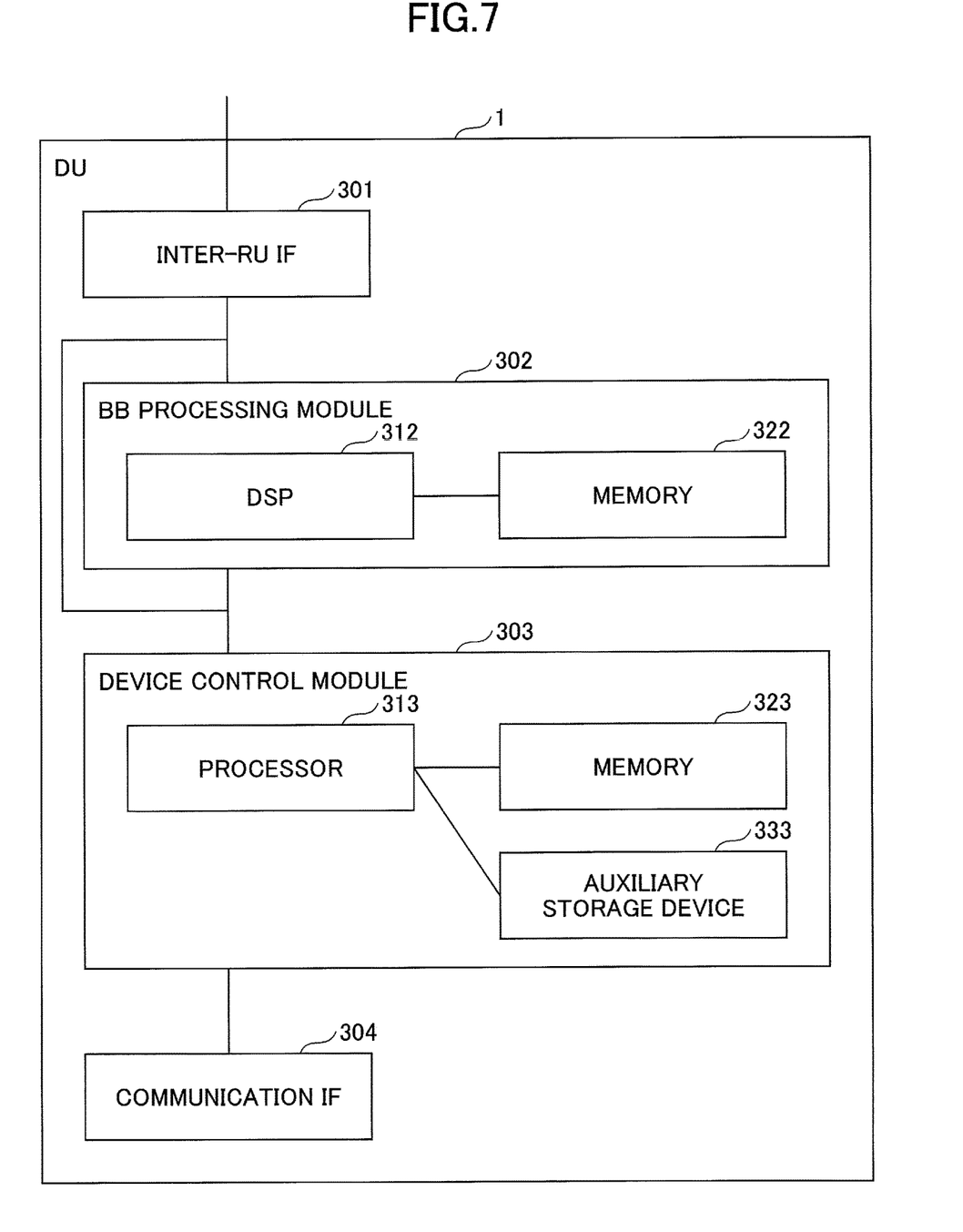
FIG. 7 is a diagram illustrating an exemplary hardware configuration of a DU according to an embodiment.

FIG. 7 is a diagram illustrating an exemplary hardware configuration of the DU according to an embodiment.

FIG. 7 illustrates a configuration that is closer to an implementation example than FIG. 5. As illustrated in FIG. 7, the DU 1 includes an inter-RU IF 301 which is an interface for a connection with the RU 2, a BB processing module 302 that performs baseband signal processing, a device control module 303 that performs processing of a higher layer, and the like, a core network And a communication I/F 304 which is an interface for a connection with a network or the OAM device 3.

The inter-RU IF 301 has a function of connecting a physical line of the FH connecting the DU 1 and the RU 2 and a function of terminating a protocol used in the FH. The inter-RU IF 301 includes, for example, a part of the inter-RU communication unit 101 illustrated in FIG. 5.

The BB processing module 302 performs a process of converting an IP packet into a signal transmitted/received to/from the RU 2 and vice versa. A digital signal processor (DSP) 312 is a processor that performs signal processing in the BB processing module 302. A memory 322 is used as a work area of the DSP 312. The BB processing module 302 includes, for example, a part of the inter-RU communication unit 101 illustrated in FIG. 5.

The device control module 303 performs protocol processing of the IP layer, operation and maintenance (OAM) processing, and the like. A processor 313 is a processor that performs processing performed by the device control module 303. A memory 323 is used as a work area of the processor 313. An auxiliary storage device 333 is, for example, an HDD or the like, and stores various kinds of configuration information and the like for an operation of the DU 1. The device control module 303 includes, for example, the notifying unit 103 and the storage unit 104. The communication IF 304 includes, for example, the inter-OAM communication unit 102.

(RU)

Figure 8:
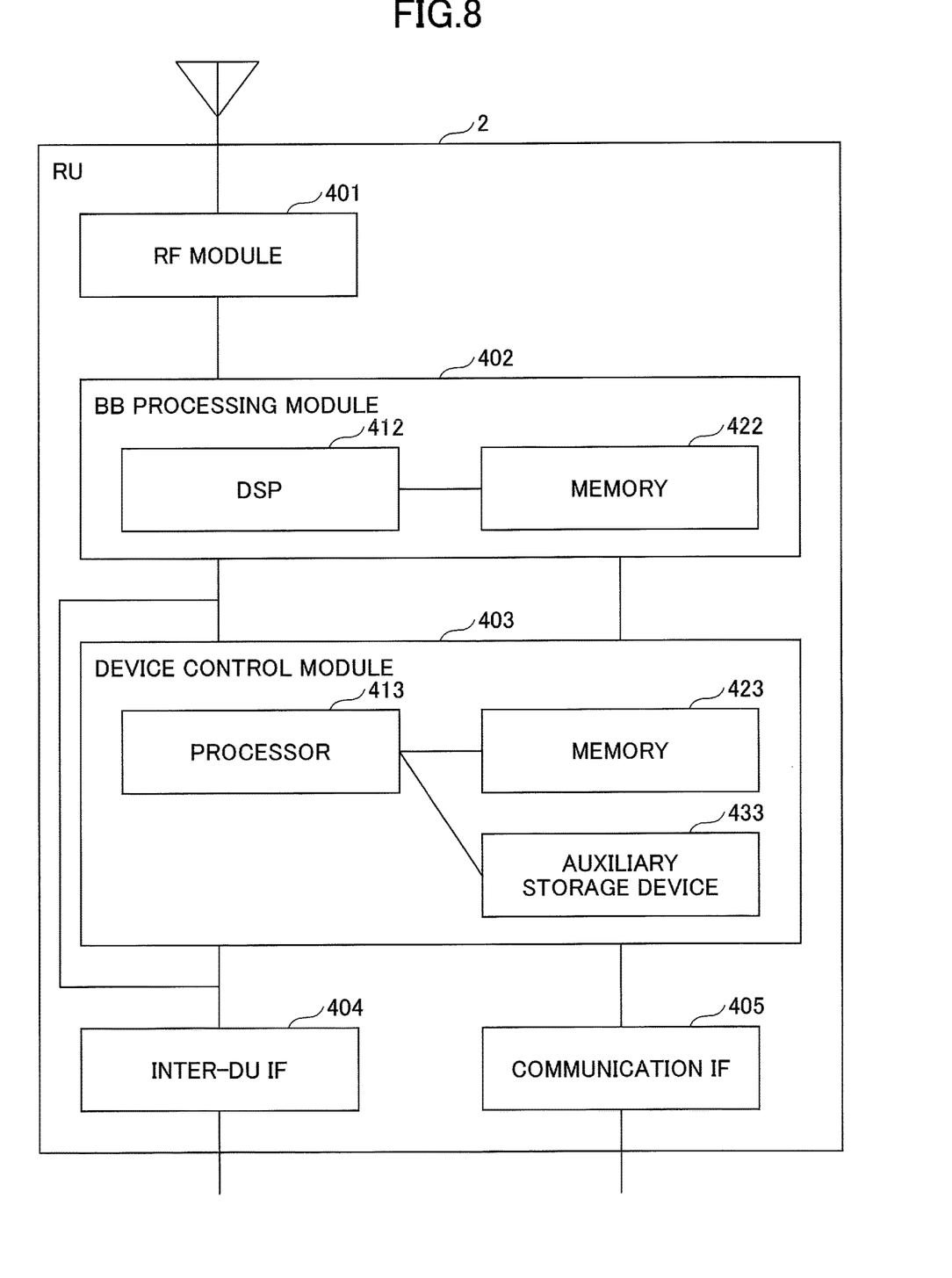
FIG. 8 is a diagram illustrating an exemplary hardware configuration of an RU according to an embodiment.

FIG. 8 is a diagram illustrating an exemplary hardware configuration of an RU according to an embodiment.

FIG. 8 illustrates a configuration that is closer to an implementation example than FIG. 6. As illustrated in FIG. 8, the RU 2 includes a radio frequency (RF) module 401 that performs processing relating to a radio signal, a baseband (BB) processing module 402 that performs baseband signal processing, a device control module 403, an inter-DU IF 404 which is an interface for a connection with the DU 1, and a communication IF 405 which is an interface for a connection with the OAM device 3 or the like.

The RF module 401 performs digital-to-analog (D/A) conversion, modulation, frequency transform, power amplification, and the like on a digital baseband signal received from the BB processing module 402 and generates a radio signal to be transmitted through an antenna. Further, the RF module 401 performs frequency transform, analog to digital (A/D) conversion, demodulation, and the like on a received radio signal, generates a digital baseband signal, and transfers the digital baseband signal to the BB processing module 402. The RF module 401 has an RF function. The RF module 401 includes, for example, a part of the inter-UE communication unit 202 illustrated in FIG. 6.

The BB processing module 402 performs a process of converting a signal transmitted/received to/from the DU 1 via the inter-DU IF 404 into a digital baseband signal and vice versa. A DSP 412 is a processor that performs signal processing in the BB processing module 402. A memory 422 is used as a work area of the DSP 412. The BB processing module 402 includes, for example, a part of the inter-UE communication unit 202 and a part of the setting unit 205 illustrated in FIG. 6.

The device control module 403 performs various kinds of processing related to the RU 2 (OAM processing and the like). A processor 413 is a processor that performs processing performed by the device control module 403. A memory 423 is used as a work area of the processor 413. An auxiliary storage device 433 is, for example, an HDD or the like, and stores various configuration information and the like for an operation of the RU 2. For example, the device control module 403 includes a part of the acquiring unit 204 and the setting unit 205.

The inter-DU IF 404 has a function of connecting the physical line of the FH connecting the DU 1 and the RU 2 and a function of terminating a protocol used in the FH. The inter-DU IF 404 includes, for example, the inter-DU communication unit 201 illustrated in FIG. 6. The communication IF 405 includes, for example, the inter-OAM communication unit 203.

<Conclusion>

As described above, according to an embodiment, provided is a base station used as a first base station in a radio communication system including the first base station, a second base station communicating with the first base station, and a user equipment communicating with the first base station, including: an acquiring unit that acquires a plurality of parameters used for an initial cell setting; and a setting unit that performs a cell setting using the acquired plurality of parameters. Thus, a technique capable of transmitting, to the RU, information necessary for a cell setting in a radio communication network according to the C-RAN is provided.

The acquiring unit may acquire the plurality of parameters when a connection is established between the base station and the second base station or when the plurality of parameters used for the initial cell setting are updated. Thus, the RU 2 can acquire the parameters necessary for the cell setting when a connection is established. Further, the RU 2 can acquire the updated parameters.

The acquiring unit may acquire the plurality of parameters transmitted from the second base station using a message used in a predetermined protocol or the plurality of parameters transmitted from a management system using a message used in operation and maintenance (OAM). Thus, the RU 2 can acquire the parameters necessary for the cell setting through various interfaces.

The plurality of parameters may include information indicating a center frequency, bandwidth and a duplex mode of a cell, a physical cell ID, information related to a master information block (MIB), information related to a system information block (SIB), and maximum transmission power. Thus, the RU 2 can perform the cell setting and transmit the broadcast information, the synchronization signal, and the reference signal using the acquired parameters.

Further, according to an embodiment, provided is a cell setting method performed by a base station used as a first base station in a radio communication system including the first base station, a second base station communicating with the first base station, and a user equipment communicating with the first base station, including: a step of acquiring a plurality of parameters used for an initial cell setting from the second base station when a predetermined trigger occurs; and a step of performing a cell setting using the acquired plurality of parameters. Thus, a technique capable of transmitting, to the RU, information necessary for a cell setting in a radio communication network according to the C-RAN is provided.

<Supplement of Embodiment>

The reference signal may be referred to as a "pilot signal."

The configurations of the devices (the DU 1 and the RU 2) described above in the embodiment of the present invention may be implemented such that a program is executed by a CPU (processor) in a device having the CPU and a memory, may be a configuration implemented by hardware such as a hardware circuit equipped with a processing logic described in the present embodiment, or may be a combination of a program and hardware.

The exemplary embodiment of the present invention has been described above, but the disclosed invention is not limited to the above embodiment, and those skilled in the art would understand that various modified examples, revised examples, alternative examples, substitution examples, and the like can be made. In order to facilitate understanding of the invention, specific numerical value examples have been used for description, but the numerical values are merely examples, and certain suitable values may be used unless otherwise stated. The classification of items in the above description is not essential to the present invention, matters described in two or more items may be combined and used as necessary, and a matter described in one item may be applied to a matter described in another item (unless inconsistent). The boundary between functional units or processing units in a functional block diagram does not necessarily correspond to the boundary between physical parts. Operations of a plurality of functional units may be performed physically by one component, or an operation of one functional unit may be performed physically by a plurality of parts. In the sequences and the flowcharts described in the embodiment, the order may be changed as long as there is no inconsistency. For the sake of convenience of description, the DU 1 and the RU 2 have been described using the functional block diagrams, but such devices may be implemented by hardware, software, or a combination thereof. Software executed by the processor included in the DU 1 according to the embodiment of the present invention and Software executed by the processor included in the RU 2 according to the embodiment of the present invention may be stored in a random access memory (RAM), a flash memory, a read only memory (ROM), an EPROM, an EEPROM, a register, a hard disk (HDD), a removable disk, a CD-ROM, a database, a server, or any other appropriate storage medium.

In the embodiment, the RU 2 is an example of a first base station. The DU 1 is an example of a second base station.

Information transmission (notification, reporting) may be performed not only by methods described in an aspect/embodiment of the present specification but also a method other than those described in an aspect/embodiment of the present specification. For example, the information transmission may be performed by physical layer signaling (e.g., DCI (Downlink Control Information), UCI (Uplink Control Information)), upper layer signaling (e.g., RRC signaling, MAC signaling, broadcast information (MIB (Master Information Block), SIB (System Information Block))), other signals, or combinations thereof. Further, an RRC message may be referred to as RRC signaling. Further, an RRC message may be, for example, an RRC connection setup message, an RRC connection reconfiguration message, or the like.

An aspect/embodiment described in the present specification may be applied to a system that uses LTE (Long Term Evolution), LTE-A (LTE-Advanced), SUPER 3G, IMT-Advanced, 4G, 5G, FRA (Future Radio Access), W-CDMA (registered trademark), GSM (registered trademark), CDMA2000, UMB (Ultra Mobile Broadband), IEEE 802.11 (Wi-Fi), IEEE 802.16 (WiMAX), IEEE 802.20, UWB (Ultra-WideBand), Bluetooth (registered trademark), other appropriate systems, and/or a next generation system enhanced based thereon.

Determination or judgment may be performed according to a value (0 or 1) represented by a bit, may be performed according to a boolean value (true or false), or may be performed according to comparison of numerical values (e.g., comparison with a predetermined value).

It should be noted that the terms described in the present specification and/or terms necessary for understanding the present specification may be replaced by terms that have the same or similar meaning. For example, a channel and/or a symbol may be a signal. Further, a signal may be a message.

There is a case in which a UE may be referred to as a subscriber station, a mobile unit, subscriber unit, a wireless unit, a remote unit, a mobile device, a wireless device, a wireless communication device, a remote device, a mobile subscriber station, an access terminal, a mobile terminal, a wireless terminal, a remote terminal, a handset, a user agent, a mobile client, a client, or some other appropriate terms.

An aspect/embodiment described in the present specification may be used independently, may be used in combination, or may be used by switching according to operations. Further, transmission of predetermined information (e.g., transmission of "it is X") is not limited to explicitly-performed transmission. The transmission of predetermined information may be performed implicitly (e.g., explicit transmission of predetermined information is not performed).

As used herein, the term "determining" may encompasses a wide variety of actions. For example, "determining" may be regarded as calculating, computing, processing, deriving, investigating, looking up (e.g., looking up in a table, a database or another data structure), ascertaining and the like. Also, "determining" may be regarded as receiving (e.g., receiving information), transmitting (e.g., transmitting information), inputting, outputting, accessing (e.g., accessing data in a memory) and the like. Also, "determining" may be regarded as resolving, selecting, choosing, establishing, comparing and the like. That is, "determining" may be regarded as a certain type of action related to determining.

As used herein, the phrase "based on" does not mean, unless otherwise noted, "based on only". In other words, the phrase "base on" means both "based on only" and "based on at least".

Also, the order of processing steps, sequences or the like of an aspect/embodiment described in the present specification may be changed as long as there is no contradiction. For example, in a method described in the present specification, elements of various steps are presented in an exemplary order. The order is not limited to the presented specific order.

Input/output information, etc., may be stored in a specific place (e.g., memory) or may be stored in a management table. The input/output information, etc., may be overwritten, updated, or added. Output information, etc., may be deleted. Input information, etc., may be transmitted to another apparatus.

Transmission of predetermined information (e.g., transmission of "it is X") is not limited to explicitly-performed transmission. The transmission of predetermined information may be performed implicitly (e.g., explicit transmission of predetermined information is not performed).

Information, a signal, etc., described in the present specification may be represented by using any one of the various different techniques. For example, data, an instruction, a command, information, a signal, a bit, a symbol, a chip or the like described throughout in the present specification may be represented by voltage, current, electromagnetic waves, magnetic fields or a magnetic particle, optical fields or a photon, or any combination thereof.

The present invention is not limited to the above embodiments and various variations, modifications, alternatives, replacements, etc., may be included in the present invention without departing from the spirit of the invention.

The present application is based on and claims the benefit of priority of Japanese Priority Application No. 2016-062577 filed on Mar. 25, 2016, the entire contents of which are hereby incorporated by reference.

EXPLANATIONS OF LETTERS OR NUMERALS

1 DU
2 RU
3 OAM device
UE user equipment
101 inter-RU communication unit
102 inter-OAM communication unit
103 notifying unit
104 storage unit
201 inter-DU communication unit
202 inter-UE communication unit
203 inter-OAM communication unit
204 acquiring unit
205 setting unit
206 storage unit
301 inter-RU IF
302 BB processing module
303 device control module
304 communication IF
401 RF module
402 BB processing module
403 device control module
404 inter-DU IF
405 communication IF

The invention claimed is:

1. A device used as a first device in a radio communication system including the first device, a second device communicating with the first device, and a user equipment communicating with the first device, the device comprising:
a processor being configured to acquire from the second device, a plurality of parameters used for an initial cell setting, the plurality of parameters including at least one of:
information indicating a center frequency, a bandwidth and a duplex mode of a cell, a physical cell ID,
information related to a master information block (MIB) for the initial cell setting,
information related to a system information block (SIB) for the initial cell setting, and maximum transmission power,
wherein the first device is a remote radio unit, and the second device is a central unit, and
wherein the first device performs a layer function different from the second device.

2. The device according to claim 1,
wherein the processor acquires the plurality of parameters when a connection is established between the device and the second device.

3. The device according to claim 1,
wherein the processor acquires the plurality of parameters transmitted from the second device using a message used in a predetermined protocol.

4. The device according to claim 1,
the processor further being configured to perform a cell setting using the acquired plurality of parameters used for an initial cell setting.

5. The device according claim 2, wherein the processor acquires the plurality of parameters transmitted from the second device using a message used in a predetermined protocol.

6. A cell setting method performed by a device used as a first device in a radio communication system including the first device, a second device communicating with the first device, and a user equipment communicating with the first device, the cell setting method comprising:
acquiring from the second device, a plurality of parameters used for an initial cell setting, the plurality of parameters including at least one of:
information indicating a center frequency, a bandwidth and a duplex mode of a cell, a physical cell ID,
information related to a master information block (MIB) for the initial cell setting,
information related to a system information block (SIB) for the initial cell setting, and maximum transmission power,
wherein the first device is a remote radio unit, and the second device is a central unit, and
wherein the first device performs a layer function different from the second device.

* * * * *